United States Patent
Binetti et al.

(10) Patent No.: US 8,891,357 B2
(45) Date of Patent: Nov. 18, 2014

(54) SWITCHING TO A PROTECTION PATH WITHOUT CAUSING PACKET REORDERING

(75) Inventors: Stefano Binetti, Monza (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 13/600,250

(22) Filed: Aug. 31, 2012

(65) Prior Publication Data

US 2014/0064292 A1 Mar. 6, 2014

(51) Int. Cl.
H04L 12/24 (2006.01)

(52) U.S. Cl.
CPC ................... H04L 41/0668 (2013.01)
USPC ........... 370/218; 370/221; 370/225; 370/242; 714/4.11

(58) Field of Classification Search
USPC ........ 370/217–228, 242–245; 714/4.11, 4.12, 714/4.2, 4.21, 4.3
See application file for complete search history.

(56) References Cited

U.S. PATENT DOCUMENTS

| | | | |
|---|---|---|---|
| 5,404,352 A | 4/1995 | Pauwels et al. | |
| 7,031,304 B1 | 4/2006 | Arberg et al. | |
| 7,310,306 B1 | 12/2007 | Cheriton | |
| 7,715,309 B2 | 5/2010 | Scholl et al. | |
| 7,940,777 B2 | 5/2011 | Asati et al. | |
| 2002/0021661 A1 | 2/2002 | DeGrandpre et al. | |
| 2005/0163115 A1 | 7/2005 | Dontu et al. | |
| 2006/0013210 A1 | 1/2006 | Bordogna et al. | |
| 2006/0140226 A1* | 6/2006 | Ho et al. | 370/539 |
| 2006/0153219 A1 | 7/2006 | Wong et al. | |
| 2010/0085873 A1 | 4/2010 | Moons | |
| 2010/0189116 A1* | 7/2010 | Brolin | 370/401 |
| 2012/0201826 A1 | 8/2012 | Fischer et al. | |
| 2013/0114593 A1 | 5/2013 | Jabr et al. | |
| 2013/0201826 A1* | 8/2013 | Testa et al. | 370/230 |
| 2014/0029622 A1 | 1/2014 | Bettink et al. | |

* cited by examiner

*Primary Examiner* — Hoon J Chung
(74) *Attorney, Agent, or Firm* — The Law Office of Kirk D. Williams

(57) ABSTRACT

In one embodiment, a working path through a packet switched network is protected by a protection path. In response to a switchover condition, a packet switching device ceases to enqueue packets for sending over the current working path. Packets are enqueue for sending over the protection path, with a delay by a predetermined duration before beginning to dequeue and send of packets over the protection path. A sending packet switching device, by delaying an appropriate predetermined duration, can guarantee that the protection switching operation will not induce packet reordering nor packet loss. This predetermined delay is calculated, possibly based on measurements, of different component delays of sending packets over the working and protection paths. For example, these component delays typically include latency within the sending device, latency of communications between the sending device and the destination, and latency with the destination.

20 Claims, 5 Drawing Sheets

SWITCHING TO A PROTECTION PATH WITHOUT CAUSING PACKET REORDERING

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques may be employed in a network to communicate packets in a network when the topology of the network changes, such as when a path over which certain packets are forwarded changes.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
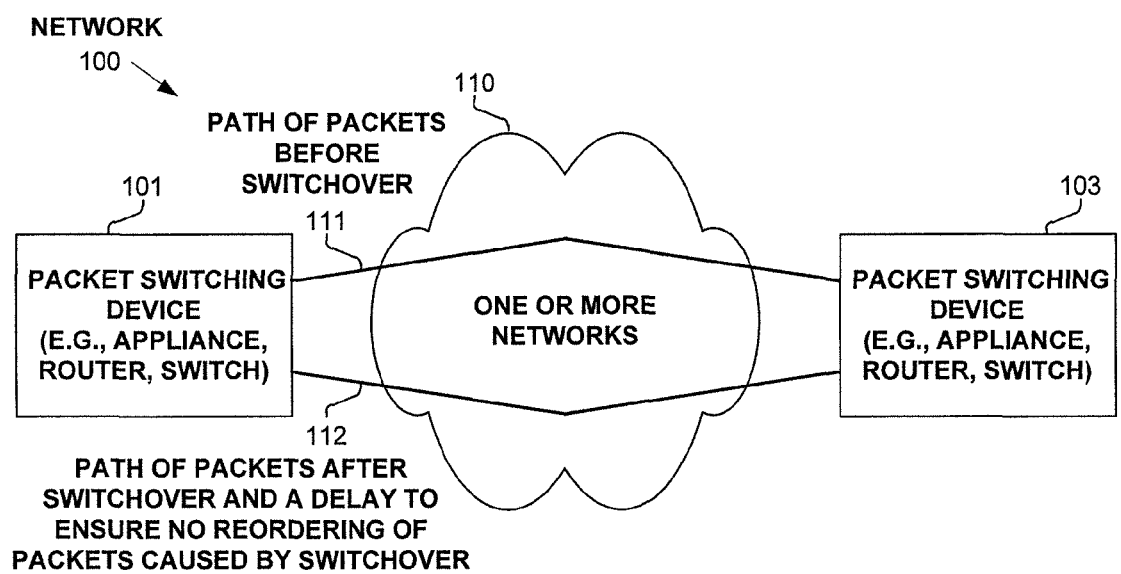
FIG. 1 illustrates a network operating according to one embodiment.

Disclosed are, inter alia, methods, apparatus, computer-storage media, mechanisms, and means associated with switching from sending packets over a working path to sending packets over a protection path without causing packet reordering or loss at the destination.

One embodiment includes: sending a plurality of packets from a packet switching device onto a first path to a destination, wherein the first path is network protected by a second path; in response to an identified protection switching condition, switching from said sending packets over the first path to sending packets from the packet switching device over the second path to the destination after delaying at least a predetermined time duration after the identified protection switching condition, wherein said predetermined time duration is calculated to be at least long enough to guarantee that packets said sent over the second path arrive at a common point within the destination after the last of said packets said sent over the first path.

One embodiment includes a packet switching device, comprising: an ingress interface configured to receive packets of a stream of packets; a first interface configured to send packets from the packet switching device onto a first path to a destination; a second interface configured to send packets from the packet switching device onto a second path to the destination, wherein the first path is network protected by the second path; wherein the packet switching device is configured to send packets of the stream of packets over the first path to the destination before an identified protection switching condition; wherein the packet switching device is configured to, in response to the identified protection switching condition, change said configuration to send packets of the stream of packets over the second path, instead of the first path, to the destination, including to delay at least a predetermined time duration after the identified protection switching condition before said sending packets of the stream of packets over the second path.

One embodiment includes a packet switching device, comprising: one or more communications mechanisms configured to communicate packets among line cards; an ingress line card, including a first virtual output queue and a second virtual output queue; one or more egress line cards including a first interface configured to send packets from the packet switching device onto a first path to a destination, and including a second interface configured to send packets from the packet switching device onto a second path to the destination, wherein the first path is network protected by a second path; wherein the ingress line card is configured to send packets from the first virtual output queue to an egress line card of said one or more egress line cards that includes the first interface, and is configured to send packets from the second virtual output queue to an egress line card of said one or more egress line cards that includes the second interface; and wherein the ingress line card is configured to enqueue packets of a stream of packets into the first virtual output queue for sending from the packet switching device over the first path to the destination before an identified protection switching condition; is configured to in response to the identified protection switching condition, changing said configuration to enqueue packets of the stream of packets into the second virtual output queue instead of into the first virtual output queue; and is configured to delay at least a predetermined time duration after the identified protection switching condition before allowing packets of the stream of packets to be dequeued from the second virtual output queue; wherein said predetermined time duration is calculated to be at least long enough to guarantee that packets said sent over the second path arrive at a common point within the destination after the last of said packets said sent over the first path.

2. Description

Disclosed are, inter alia, methods, apparatus, computer-storage media, mechanisms, and means associated with switching from sending packets over a working path to sending packets over a protection path without causing packet reordering or loss at the destination. Multiprotocol Label Switched (MPLS), MPLS Transport Profile (MPLS-TP), and other types of paths are frequently used in networks to communicate packets from one packet switching device to a destination. Additionally, 1:1 network protection is often used to have a pre-established protection path for a working path. This protection switching can be automatic or manual (e.g., in response to an operator and network management system instruction). It is desirable that the switchover process does not induce packet loss nor packet reordering.

One embodiment, in response to a switchover condition, a packet switching device ceases to enqueue packets for sending over the current working path. Packets are enqueue for sending over the protection path, with a delay by a predetermined duration before beginning to dequeue and send of packets over the protection path. By delaying the predetermined duration, packets sent over the first path are guaranteed to arrive at a common or merging point within the destination prior to any packets sent over the protection path, hence avoiding packet reordering caused by the protection switching operation.

This predetermined delay is calculated, possibly based on measurements, of different component delays of sending packets over the working and protection paths. For example, these component delays typically include latency within the sending device (e.g., queuing/scheduling delays, transmit times as there may be several packets remaining in a queue for sending over the working path at the time of the identified protection switching condition), latency of communications between the sending device and the destination, and latency with the destination. Each of these component delays can be different for sending packets over the working and protection paths. The predetermined delay is calculated to be large enough to guarantee that a first packet sent over the protection path does not arrive at a common point within the destination before the last packet enqueued for sending over the working path to the destination in order to prevent packet reordering caused by the protection switching operation. As this is a one-time delay, one embodiment includes in the predetermined delay an extra duration amount to ensure that it is long enough even with many packets remaining queued for sending over the working path and/or the transmit latency over the working path is much greater than that of the protection path.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes: sending a plurality of packets from a packet switching device onto a first path to a destination, wherein the first path is network protected by a second path; in response to an identified protection switching condition, switching from said sending packets over the first path to sending packets from the packet switching device over the second path to the destination after delaying at least a predetermined time duration after the identified protection switching condition, wherein said predetermined time duration is calculated to be at least long enough to guarantee that packets said sent over the second path arrive at a common point within the destination after the last of said packets said sent over the first path.

In one embodiment, the identified protection switching condition is a manual (e.g., user/operator driven/initiated) protection switching operation. In one embodiment, each of the first and second paths is a Multiprotocol Label Switched (MPLS) path (LSP). In one embodiment, each of said LSPs is an MPLS Transport Profile (MPLS-TP) LSP. In one embodiment, said network protected is 1:1 protection.

In one embodiment, the predetermined time duration includes a component duration for a latency of packets traveling from the packet switching device to the destination over the second path relative to packets traveling from the packet switching device to the destination over the first path. In one embodiment, the predetermined time duration includes a component duration for a latency of packets traveling within the packet switching device that are sent over the second path relative to packets traveling within the packet switching device that are sent over the first path. In one embodiment, the predetermined time duration includes a component duration for a latency of packets traveling within the destination to the common point that are sent over the second path relative to packets traveling within the destination to the common point that are sent over the first path.

One embodiment comprises determining the predetermined time duration, including measuring a first latency including a duration of a packet traveling from the packet switching device to the destination over the first path, and a second latency including a duration of a packet traveling from the packet switching device to the destination over the second path. One embodiment comprises determining the predetermined time duration, including estimating a first latency including a duration of a packet traveling from the packet switching device to the destination over the first path, and a second latency including a duration of a packet traveling from the packet switching device to the destination over the second path.

In one embodiment, said sending the plurality of packets from the packet switching device onto the first path to the destination, includes: enqueuing packets on a first line card into a first virtual output queue associated with sending packets over the first path, communicating packets from the first virtual output queue over a communications mechanism to a second line card, and sending packets from the second line card onto the first path; and wherein said switching from said sending packets over the first path to sending packets from the packet switching device over the second path to the destination after delaying at least the predetermined time duration after the identified protection switching condition, includes: switching from said enqueuing packets into the first virtual output queue to enqueuing packets on the first line card into a second virtual output queue associated with sending packets over the second path, delaying at least a predetermined time duration after said switching and before removing any packets from the second virtual output queue; communicating packets from the second virtual output queue over a communications mechanism to a third line card, and sending packets from the third line card onto the second path.

In one embodiment, said sending the plurality of packets from the packet switching device onto the first path to the destination, includes: enqueuing packets on a first line card into a first virtual output queue associated with sending packets over the first path, communicating packets from the first virtual output queue over a communications mechanism to a second line card, and sending packets from the second line card onto the first path; and wherein said switching from said sending packets over the first path to sending packets from the packet switching device over the second path to the destination after delaying at least the predetermined time duration after the identified protection switching condition, includes: switching from said enqueuing packets into the first virtual output queue to enqueuing packets on the first line card into a second virtual output queue associated with sending packets over the second path, delaying at least a predetermined time duration after said switching and before removing any packets from the second virtual output queue; communicating packets from the second virtual output queue over a communications mechanism to the second line card, and sending packets from the second line card onto the second path.

One embodiment includes a packet switching device, comprising: an ingress interface configured to receive packets of a stream of packets; a first interface configured to send packets from the packet switching device onto a first path to a destination; a second interface configured to send packets from the packet switching device onto a second path to the destination, wherein the first path is network protected by the second path; wherein the packet switching device is configured to send packets of the stream of packets over the first path to the destination before an identified protection switching condition; wherein the packet switching device is configured to, in response to the identified protection switching condition, change said configuration to send packets of the stream of packets over the second path, instead of the first path, to the destination, including to delay at least a predetermined time duration after the identified protection switching condition before said sending packets of the stream of packets over the second path.

In one embodiment, the identified protection switching condition is a manual protection switching operation. In one embodiment, the predetermined time duration includes a component duration for a latency of packets traveling from the packet switching device to the destination over the second path relative to packets traveling from the packet switching device to the destination over the first path. In one embodiment, the predetermined time duration includes a component duration for a latency of packets traveling within the packet switching device that are sent over the second path relative to packets traveling within the packet switching device that are sent over the first path; and wherein the predetermined time duration includes a component duration for a latency of packets traveling within the destination to a common point that are sent over the second path relative to packets traveling within the destination to the common point that are sent over the first path.

One embodiment includes a packet switching device, comprising: one or more communications mechanisms configured to communicate packets among line cards; an ingress line card, including a first virtual output queue and a second virtual output queue; one or more egress line cards including a first interface configured to send packets from the packet switching device onto a first path to a destination, and including a second interface configured to send packets from the packet switching device onto a second path to the destination, wherein the first path is network protected by a second path; wherein the ingress line card is configured to send packets from the first virtual output queue to an egress line card of said one or more egress line cards that includes the first interface, and is configured to send packets from the second virtual output queue to an egress line card of said one or more egress line cards that includes the second interface; and wherein the ingress line card is configured to enqueue packets of a stream of packets into the first virtual output queue for sending from the packet switching device over the first path to the destination before an identified protection switching condition; is configured to in response to the identified protection switching condition, changing said configuration to enqueue packets of the stream of packets into the second virtual output queue instead of into the first virtual output queue; and is configured to delay at least a predetermined time duration after the identified protection switching condition before allowing packets of the stream of packets to be dequeued from the second virtual output queue; wherein said predetermined time duration is calculated to be at least long enough to guarantee that packets said sent over the second path arrive at a common point within the destination after the last of said packets said sent over the first path.

In one embodiment, the identified protection switching condition is a manual protection switching operation. In one embodiment, the predetermined time duration includes a component duration for a latency of packets traveling from the packet switching device to the destination over the second path relative to packets traveling from the packet switching device to the destination over the first path.

Expressly turning to the figures, FIG. 1 illustrates a network 100, including packet switching device 101, packet switching device 103 and one or more packet switched networks 110. Working path 111 and protection path 112 are established between packet switching devices 101 and 103. In one embodiment, each of paths 111 and 112 is a Multiprotocol Label Switched (MPLS) path (LSP). In one embodiment, each of paths 111 and 112 is an MPLS Transport Profile (MPLS-TP) LSP. In one embodiment, one or more of paths 111 and 112 include link aggregation groups.

Packet switching device 101 sends packets over working path 111 to packet switching device 103. In response to a switchover condition, packet switching device 101 ceases to enqueue packets for sending over working path 111. Packet switching device 101 enqueues packets for sending over protection path 112, but delays by a predetermined duration before dequeuing and sending of packets over protection path 112. By delaying the predetermined duration, packets sent over first path 111 are guaranteed to arrive at a common or merging point within the destination packet switching device 103 prior to any packets sent over protection path 112. This predetermined delay is calculated, possibly based on measurements, of different component delays of sending packets over the working and protection paths 111, 112. For example, these component delays typically include latency within sending packet switching device 101, latency of communications between the sending device and the destination over paths 111 and 112, and latency with the destination packet switching device 103. Sending packet switching device 101, by delaying an appropriate predetermined duration, can guarantee that the protection switching operation will not induce packet reordering.

Figure 2A:
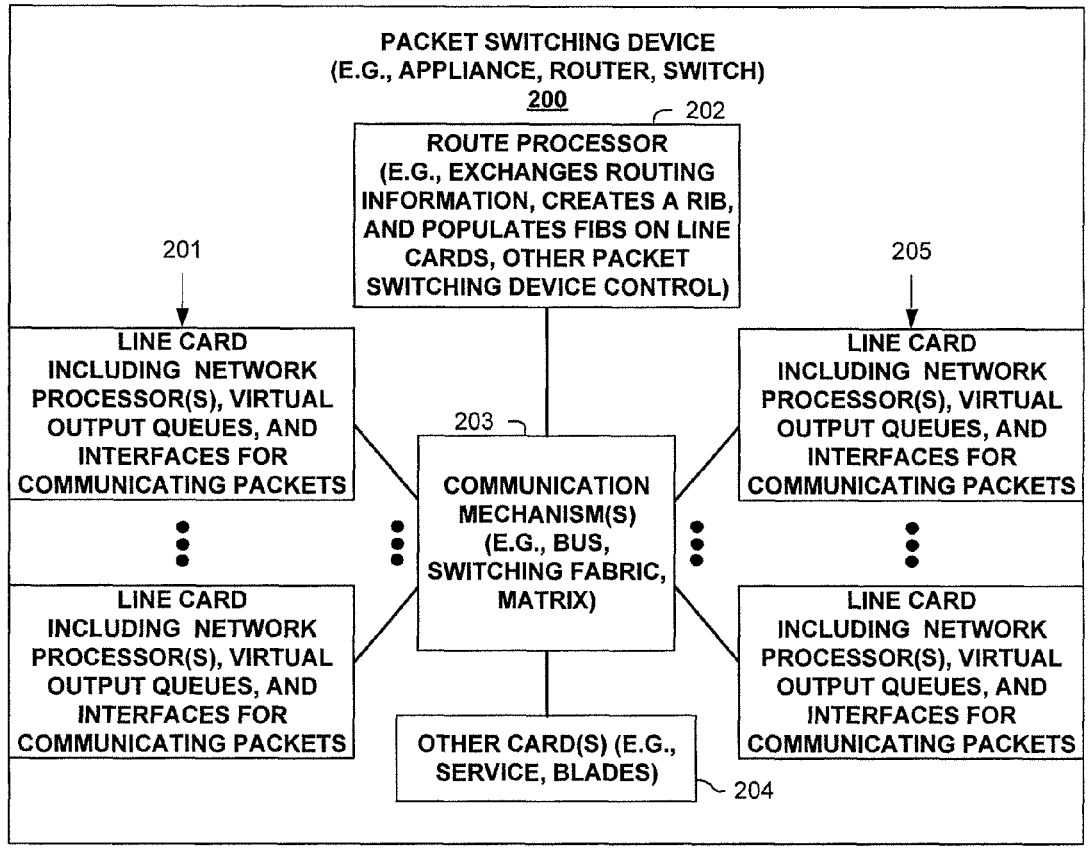
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with switching to a protection path without causing packet reordering or loss. In one embodiment, ingress line cards 201 and 205 include virtual output queues configured for queuing packets for sending over communication mechanism(s) 203 to another line card (201, 205) for sending from packet switching device 200. In one embodiment, egress line cards 201 and 205 include virtual output queues configured for queuing packets in the egress lines (e.g., instead of, or in addition to, on ingress line cards) for sending from packet switching device 200. In one embodiment, communication mechanism(s) 203 include the virtual output queues (e.g., instead of, or in addition to, on ingress and/or egress line cards). Note, line cards 201 and 205 typically perform the actions of being both an ingress and egress line card, in regards to multiple other particular packets and/or packet streams being received by, or sent from, packet switching device 200.

Packet switching device 200 also has a control plane with one or more processing elements 202 for managing the control plane and/or control plane processing of packets associated with switching to a protection path without causing packet reordering or loss. Packet switching device 200 also includes other cards 204 (e.g., service cards, blades) which include processing elements that are used in one embodiment to process packets associated with switching to a protection path without causing packet reordering or loss, and some communication mechanism 203 (e.g., bus, switching fabric, matrix) for allowing its different entities 201, 202, 204 and 205 to communicate.

In one embodiment, a line card 201 receives a stream of packets on one of its interfaces. Packets are initially enqueued in line card 201 in a first virtual output queue for sending over a first path to a destination. Packets are drained from the first virtual output queue, communicated over communications mechanism 203 to another line card 201, 205, and then out of packet switching device 200 onto the first path. In response to an identifiable switching condition (e.g., manual switch, error condition), packets of the stream of packets are now enqueued in line card 201 in a second virtual output queue for sending over a second path to the destination. After a predetermined delay to guarantee packets are not reordered within the destination because of protection switching from the first path to the second path, packets are drained from the second virtual output queue, communicated over communications mechanism 203 to another line card 201, 205, and then out of packet switching device 200 onto the second path.

Figure 2B:
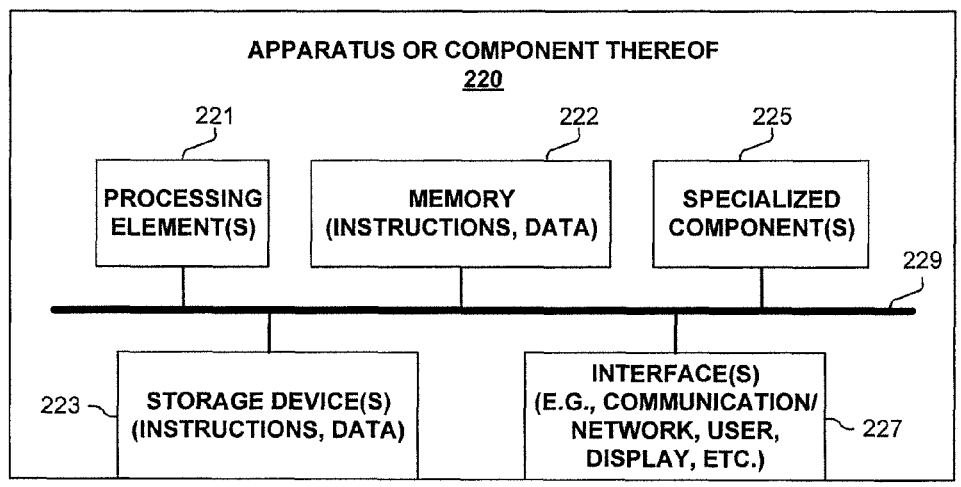
FIG. 2B illustrates an apparatus according to one embodiment.

FIG. 2B is a block diagram of an apparatus 220 used in one embodiment associated with switching to a protection path without causing packet reordering or loss. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
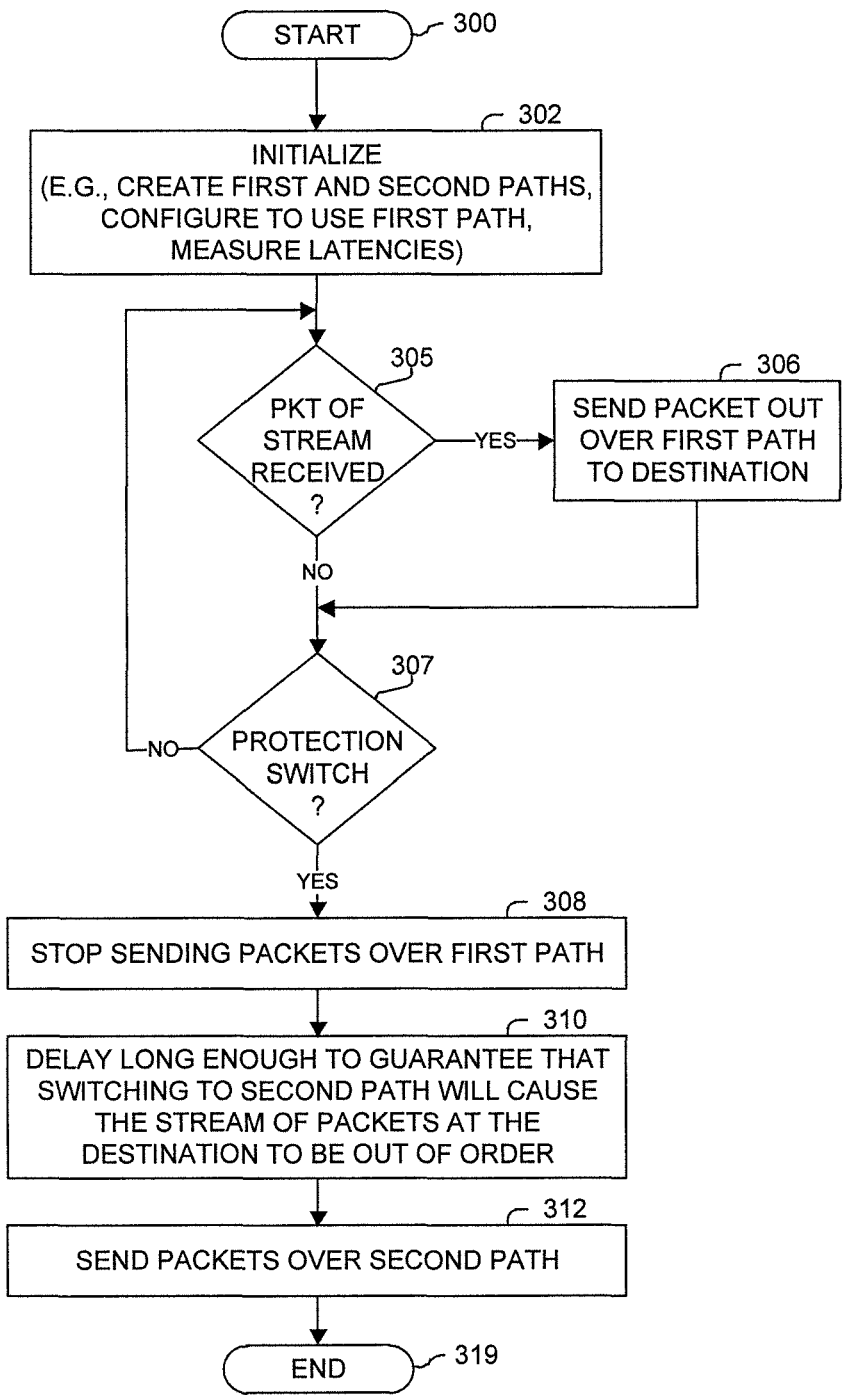
FIG. 3 illustrates a process according to one embodiment.

FIG. 3 illustrates a process performed in one embodiment for communicating packets of a packet stream between a packet switching device and a destination. Processing begins with process block 300. In process block 302, initialization operations are performed. First and second paths (e.g., working and protection paths) are configured through one or more networks for communicating packets between a packet switching device and a destination. The packet switching device is initially configured to use the first path to send packets to the destination.

In one embodiment, relative or absolute delay measurements are performed such as using probe or actual data traffic to understand one or more components of communication time within and/or between the source packet switching device and the destination. These measured latencies are used in determining the predetermined delay period used to delay the initial sending of packets over the second path in response to a protection switch operation from sending over the first path.

As determined in process block 305, if a packet of the packet stream is received, then in process block 306, the packet is sent out over the first path to the destination. Next, as determined in process block 307, if a packet switching condition has not been identified, then processing returns to process block 305.

Otherwise, when as determined in process block 307, in response to an identifiable packet switching condition, then processing proceeds to process block 308, wherein the packet switching device stops sending packets of the packet stream over the first path to the destination. In process block 310, the packet switching device delays long enough to guarantee that packets subsequently sent over the second path will arrive after packets previously sent over the first path. In process block 312, sending of packets of the packet stream to the destination is resumed with packets being sent over the second path. Processing of the flow diagram of FIG. 3 is complete as indicated by process block 319.

Figure 4A:
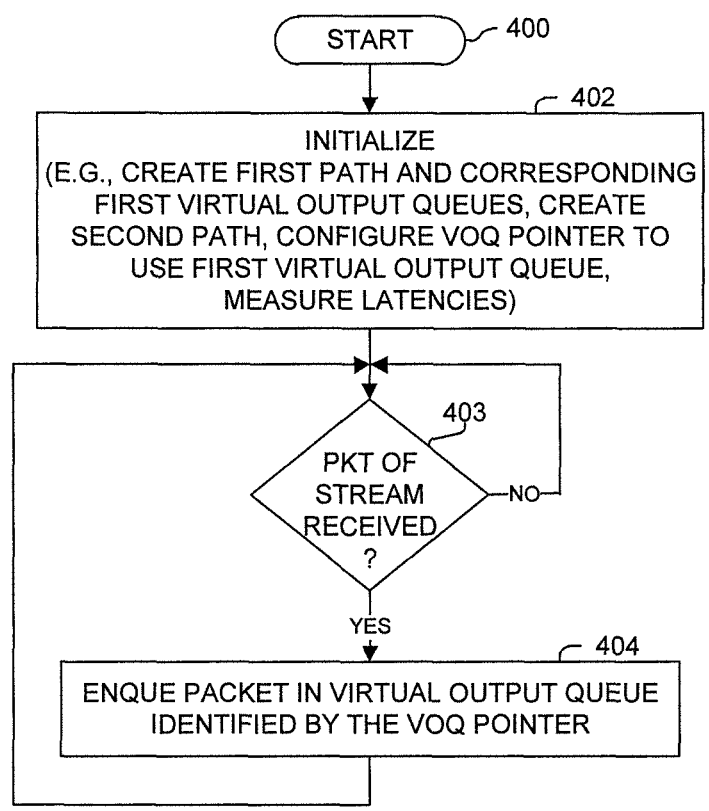
FIG. 4A illustrates a process according to one embodiment.
Figure 4B:
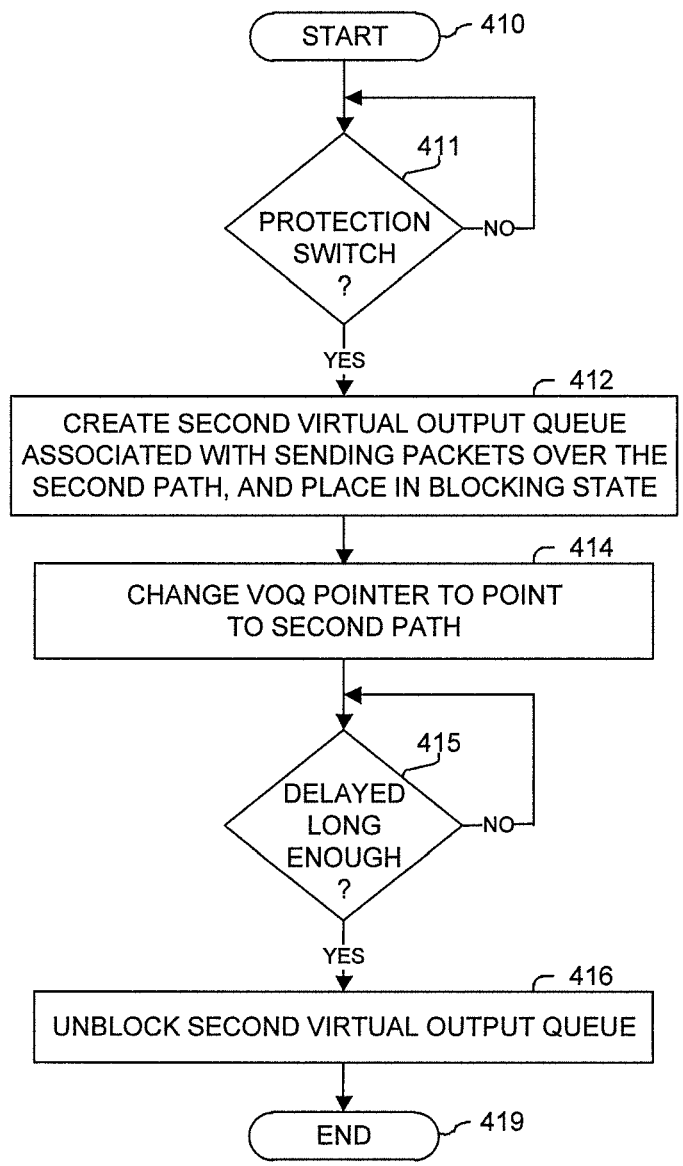
FIG. 4B illustrates a process according to one embodiment.

FIGS. 4A-B illustrate processes performed in one embodiment. Processing of the flow diagram of FIG. 4A begins with process block 400. In process block 402, initialization operations are performed. First and second paths (e.g., working and protection paths) are configured through one or more networks for communicating packets between a packet switching device and a destination. A first a virtual output queue is established for queuing packets for sending over the first path. A virtual output queue pointer is set to point to the first virtual output queue, such that packets of a packet stream will be initially sent over the first path to the destination. Additionally, in one embodiment, relative or absolute delay measurements are performed such as using probe or actual data traffic to understand one or more components of communication time within and/or between the source packet switching device and the destination. These measured latencies are used in determining the predetermined delay period used to delay the initial sending of packets over the second path in response to a protection switch operation from sending over the first path.

As determined in process block 403, when a packet of the packet stream is received and to be sent to the destination, then in process block 404, the received packet is enqueued in the virtual output queue identified by the virtual output queue pointer. Note, packets are dequeued by scheduling and/or other mechanisms of the packet switching device and correspondingly sent through the packet switching device and out corresponding interfaces of the packet switching device. Processing of the flow diagram of FIG. 4A returns to process block 403 for processing of more packets of the packet stream.

Processing of the flow diagram of FIG. 4B begins with process block 410. Processing loops at process block 411 until an identifiable protection switch condition exists (e.g., a manual switchover such as in response to an operator or network management instruction, an automated switchover such as at a predetermined time/day, or other condition).

In response to an identifiable protection switch condition, processing proceeds to process block 412, wherein a second virtual output queue is created and associated with sending packets out the second path, with the second virtual output queue placed in a blocking state (e.g., so that no packets are dequeued from it). Note, in one embodiment, the second virtual output queue is created and associated with sending packets over the second path as part of the initialization performed in process block 402 of FIG. 4A. In process block 414, the virtual output queue pointer is changed to point to the second virtual output queue (causing packets to be enqueued in the second virtual output queue rather than the first virtual output queue in process block 404 of FIG. 4A). Processing remains at process block 415 until the delay is long enough to ensure that the protection switching to send packets over the second path instead of the first path will not induce packet reordering (e.g., one or more packets sent over the second path will be processed by the destination before a packet previously sent over the first path). After at least this predetermined delay has occurred, then in process block 416, the second virtual output queue is unblocked such that packets will be dequeued by the packet switching device and sent over the second path to the destination. Processing of the flow diagram of FIG. 4B is complete as indicated by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
sending a plurality of packets from a packet switching device onto a first path to a destination, wherein the first path is network protected by a second path;
calculating a predetermine time duration that includes one or more latencies within the packet switching device, one or more latencies between the packet switching device and the destination, and one or more latencies within the destination;
in response to an identified protection switching condition, switching from said sending packets over the first path to sending packets from the packet switching device over the second path to the destination after delaying at least the predetermined time duration after the identified protection switching condition, wherein said predetermined time duration is calculated to be at least long enough to guarantee that said packets sent over the second path arrive at a common point within the destination after the last of said packets said sent over the first path.

2. The method of claim 1, wherein the identified protection switching condition is a manual protection switching operation.

3. The method of claim 2, wherein each of the first and second paths is an Multiprotocol Label Switched (MPLS) path (LSP).

4. The method of claim 3, wherein each of said LSPs is an MPLS Transport Profile (MPLS-TP) LSP.

5. The method of claim 2, wherein said network protected is 1:1 protection.

6. The method of claim 1, wherein the predetermined time duration includes a component duration for a latency of packets traveling from the packet switching device to the destination over the second path relative to packets traveling from the packet switching device to the destination over the first path.

7. The method of claim 6, wherein the predetermined time duration includes a component duration for a latency of packets traveling within the packet switching device that are sent over the second path relative to packets traveling within the packet switching device that are sent over the first path.

8. The method of claim 7, wherein the predetermined time duration includes a component duration for a latency of packets traveling within the destination to the common point that are sent over the second path relative to packets traveling within the destination to the common point that are sent over the first path.

9. The method of claim 6, wherein the predetermined time duration includes a component duration for a latency of packets traveling within the destination to the common point that are sent over the second path relative to packets traveling within the destination to the common point that are sent over the first path.

10. The method of claim 9, comprising: determining the predetermined time duration, including measuring a first latency including a duration of a packet traveling from the packet switching device to the destination over the first path, and a second latency including a duration of a packet traveling from the packet switching device to the destination over the second path.

11. The method of claim 6, comprising: determining the predetermined time duration, including estimating a first latency including a duration of a packet traveling from the packet switching device to the destination over the first path, and a second latency including a duration of a packet traveling from the packet switching device to the destination over the second path.

12. The method of claim 1, wherein said sending the plurality of packets from the packet switching device onto the first path to the destination, includes: enqueuing packets on a first line card into a first virtual output queue associated with sending packets over the first path, communicating packets from the first virtual output queue over a communications mechanism to a second line card, and sending packets from the second line card onto the first path; and wherein said switching from said sending packets over the first path to sending packets from the packet switching device over the second path to the destination after delaying at least the predetermined time duration after the identified protection switching condition, includes: switching from said enqueuing packets into the first virtual output queue to enqueuing packets on the first line card into a second virtual output queue associated with sending packets over the second path, delaying at least a predetermined time duration after said switching and before removing any packets from the second virtual output queue; communicating packets from the second virtual output queue over a communications mechanism to a third line card, and sending packets from the third line card onto the second path.

13. The method of claim 1, wherein said sending the plurality of packets from the packet switching device onto the first path to the destination, includes: enqueuing packets on a first line card into a first virtual output queue associated with sending packets over the first path, communicating packets from the first virtual output queue over a communications mechanism to a second line card, and sending packets from the second line card onto the first path; and wherein said switching from said sending packets over the first path to sending packets from the packet switching device over the second path to the destination after delaying at least the predetermined time duration after the identified protection switching condition, includes: switching from said enqueuing packets into the first virtual output queue to enqueuing packets on the first line card into a second virtual output queue associated with sending packets over the second path, delaying at least a predetermined time duration after said switching and before removing any packets from the second virtual output queue; communicating packets from the second virtual output queue over a communications mechanism to the second line card, and sending packets from the second line card onto the second path.

14. A packet switching device, comprising:

an ingress interface configured to receive packets of a stream of packets;

a first interface configured to send packets from the packet switching device onto a first path to a destination;

a second interface configured to send packets from the packet switching device onto a second path to the destination, wherein the first path is network protected by the second path;

wherein the packet switching device is configured to send packets of the stream of packets over the first path to the destination before an identified protection switching condition and to calculate a predetermine time duration that includes one or more latencies within the packet switching device, one or more latencies between the packet switching device and the destination, and one or more latencies within the destination;

wherein the packet switching device is configured to, in response to the identified protection switching condition, change said configuration to send packets of the stream of packets over the second path, instead of the first path, to the destination, including to delay at least the predetermined time duration after the identified protection switching condition before said sending packets of the stream of packets over the second path.

15. The packet switching device of claim 14, wherein the identified protection switching condition is a manual protection switching operation.

16. The packet switching device of claim 14, wherein the predetermined time duration includes a component duration for a latency of packets traveling from the packet switching device to the destination over the second path relative to packets traveling from the packet switching device to the destination over the first path.

17. The packet switching device of claim 16, wherein the predetermined time duration includes a component duration for a latency of packets traveling within the packet switching device that are sent over the second path relative to packets traveling within the packet switching device that are sent over the first path; and wherein the predetermined time duration includes a component duration for a latency of packets traveling within the destination to a common point that are sent over the second path relative to packets traveling within the destination to the common point that are sent over the first path.

18. A packet switching device, comprising:

one or more communications mechanisms configured to communicate packets among line cards;

an ingress line card, including a first virtual output queue and a second virtual output queue;

one or more egress line cards including a first interface configured to send packets from the packet switching device onto a first path to a destination, and including a second interface configured to send packets from the packet switching device onto a second path to the destination, wherein the first path is network protected by the second path;

wherein the ingress line card is configured to send packets from the first virtual output queue to an egress line card of said one or more egress line cards that includes the first interface, and is configured to send packets from the second virtual output queue to an egress line card of said one or more egress line cards that includes the second interface; and wherein the packet switching device is configured to calculate a predetermined time duration that includes one or more latencies within the packet switching device, one or more latencies between the packet switching device and the destination, and one or more latencies within the destination;

wherein the ingress line card is configured to enqueue packets of a stream of packets into the first virtual output queue for sending from the packet switching device over the first path to the destination before an identified protection switching condition; is configured to in response to the identified protection switching condition, changing said configuration to enqueue packets of the stream of packets into the second virtual output queue instead of into the first virtual output queue; and is configured to delay at least the predetermined time duration after the identified protection switching condition before allowing packets of the stream of packets to be dequeued from the second virtual output queue; wherein said predetermined time duration is calculated to be at least long enough to guarantee that said packets sent over the second path arrive at a common point within the destination after the last of said packets said sent over the first path.

19. The packet switching device of claim 18, wherein the identified protection switching condition is a manual protection switching operation.

20. The packet switching device of claim 18, wherein the predetermined time duration includes a component duration for a latency of packets traveling from the packet switching device to the destination over the second path relative to packets traveling from the packet switching device to the destination over the first path.

\* \* \* \* \*